United States Patent
Nakamura et al.

(10) Patent No.: US 7,177,564 B2
(45) Date of Patent: Feb. 13, 2007

(54) IMAGE FORMING METHOD AND IMAGE FORMING APPARATUS CONNECTED TO A FINISHER

(75) Inventors: Shoichi Nakamura, Hachioji (JP); Masaru Ushio, Hachioji (JP); Takao Kurohata, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 99 days.

(21) Appl. No.: 10/937,638

(22) Filed: Sep. 9, 2004

(65) Prior Publication Data

US 2005/0158068 A1 Jul. 21, 2005

(30) Foreign Application Priority Data

Jan. 16, 2004 (JP) .............................. 2004-009325

(51) Int. Cl.
*G03G 15/00* (2006.01)

(52) U.S. Cl. ...................... 399/82; 399/407; 399/410

(58) Field of Classification Search .................. 399/82, 399/405, 397, 407, 408, 409, 410
See application file for complete search history.

(56) References Cited

U.S. PATENT DOCUMENTS 5,508,798 A * 4/1996 Yamada ...................... 399/410
5,930,001 A * 7/1999 Satoh et al. ............. 399/410 X
6,567,628 B1 * 5/2003 Guillemin et al. ............. 399/82

FOREIGN PATENT DOCUMENTS

| JP | 06-255283 | 9/1994 |
| JP | 2001-075421 | 3/2001 |
| JP | 2003-162101 | 6/2003 |

* cited by examiner

*Primary Examiner*—Sandra L Brase
(74) *Attorney, Agent, or Firm*—Cohen, Pontani, Lieberman & Pavane LLP

(57) ABSTRACT

There is described an image forming apparatus combined with a finisher for applying finish processing such as stapling. The image-forming apparatus includes: a reading section to read an original image so as to generate image data of the original image; a designating section to designate a first direction of the original image to be read by the reading section and a second direction of an output image to be ejected; an image-processing section to apply image-processing, which includes an image-rotation processing, to the image data so as to generate processed image data; a controlling section to control a rotation angle to be employed for rotating the image data by the image-rotation processing, referring to the first direction and the second direction, so that a direction of the output image coincides with the second direction; and an image-forming section to form the output image based on the processed image data.

12 Claims, 12 Drawing Sheets

FIG. 3

| SPECIFY THE DOCUMENT SETTING DIRECTION, DOCUMENT IMAGE QUALITY AND PRESENCE/ABSENCE OF A SPECIAL DOCUMENT | | JOB 10 |
|---|---|---|
| DOCUMENT SETTING DIRECTION | DOCUMENT IMAGE QUALITY | SPECIAL DOCUMENT |
| A  A | AUTO | NORMAL DOCUMENT |
| ◁  ◁ | PENCIL | MIXED DOCUMENTS |
| ∀  ∀ | PHOTO | DOCUMENT FOLDED IN LETTER Z |
| ▷  ▷ | LETTER | |
| | | CANCEL  OK |

FIG. 4

| SELECT THE FINISHER MODE | | | | JOB 10 |
|---|---|---|---|---|
| EJECTION TRAY | DOUBLE-SIDE BINDING DIRECTION | STABLE | POST-PROCESSING OF THE MAIN TRAY | |
| SUB-TRAY | LATERAL BINDING | A  A | GROUP | COVER SHEET |
| | VERTICAL BINDING | A  A | SORT | PUNCH |
| | | A  A | SADDLE STITCHING | FOLDING IN THE SHAPE OF A LETTER Z |
| | | A  A | DOUBLE FOLDING | FOLDED IN THREE |
| KEEP THE HDD | SELECT WHERE TO EJECT | SET THE TOP POSITION | STANDARD RESET | CANCEL  OK |

FIG. 5

| DIRECTION OF TOP POSITION |
|---|
| A  A |
| ◁  ◁ |
| ∀  ∀ |
| ▷  ▷ |
| CANCEL  OK |

FIG. 14

RESTRICTIONS ON STAPLING AND PUNCHING, AND PRESENCE/ABSENCE OF PRIORITY OF FINISHING

| DOCUMENT FEED: IMAGE DIRECTION | DOCUMENT → IMAGE ROTATION? → TRANSFER SHEET | PUNCH (LEFT OR RIGHT) | PUNCH (TOP) | STAPLE (TWO POSITIONS ON LEFT) | STAPLE (TWO POSITIONS ON TOP) |
|---|---|---|---|---|---|
| LEF: Portrait | A → A | ○ | × | ○ | × |
|  | A PROCESSING OF ROTATION ⊲ | × | ○ | × | ○ |
| SEF: Landscape | A → A | ○ | × | ○ | × |
|  | A PROCESSING OF ROTATION ⊲ | × | ○ | × | ○ |
| LEF: Landscape | ⊲ → ⊲ | × | ○ | × | ○ |
|  | ⊲ PROCESSING OF ROTATION A | ○ | × | ○ | × |
| SEF: Portrait | ⊲ → ⊲ | × | ○ | × | ○ |
|  | ⊲ PROCESSING OF ROTATION A | ○ | × | ○ | × |
| LEF: Portrait PLACED AT REVERSED POSITION | ∀ PROCESSING OF ROTATION A | ○ | × | ○ | × |
|  | ∀ PROCESSING OF ROTATION ⊲ | × | ○ | × | ○ |
| SEF: Landscape PLACED AT REVERSED POSITION | ∀ PROCESSING OF ROTATION A | ○ | × | ○ | × |
|  | ∀ PROCESSING OF ROTATION ⊲ | × | ○ | × | ○ |
| LEF: Landscape PLACED AT REVERSED POSITION | ⊳ PROCESSING OF ROTATION ⊲ | × | ○ | × | ○ |
|  | ⊳ PROCESSING OF ROTATION A | ○ | × | ○ | × |
| SEF: Portrait PLACED AT REVERSED POSITION | ⊳ PROCESSING OF ROTATION ⊲ | × | ○ | × | ○ |
|  | ⊳ PROCESSING OF ROTATION A | ○ | × | ○ | × |

IMAGE FORMING METHOD AND IMAGE FORMING APPARATUS CONNECTED TO A FINISHER

BACKGROUND OF THE INVENTION

The present invention relates to an image forming method and image forming apparatus, particularly to an image forming method and image forming apparatus when the image forming apparatus is connected with a finisher for applying processing of finishing such as stapling.

When images of a plurality of documents have been formed by an image forming apparatus such as a copying machine, sheets are collated for each copy and are bound by stapling (staple-finishing) in some cases.

In this case, a finisher is placed adjacent to the image forming apparatus proper and the transfer sheet ejected from the image forming apparatus proper is received by the finisher, which applies processing of staple-finishing.

When such staple finishing is performed, one of the four corners of the document is specified if one-point binding (corner stapling) is used. When two-point binding (lateral stapling) is used, any one of four edges is specified.

To cope with the staple position specified by the user, the finisher must be designed to permit stapling on any one of the four corners or edges of the sheet. To put it another way, the user has been unable to specify a desired staple position when a finisher is capable of stapling on one position or one side (edge) alone, according to the prior art.

To provide an apparatus capable of stapling at any one of the four corners or edges, the staple mechanism is complicated and the stapling apparatus is costly.

To solve this problem, a proposal has been made in JP 06-255283, wherein an image is formed after the image is rotated by image processing in order to staple a transfer sheet at a desired position using a finisher where stapling position is restricted.

For the direction of the transfer sheet or image at the time of ejection, JP 2003-162101 given below discloses the art of ejecting the transfer sheet ejected wherein its specified side—either the obverse or reverse side—is kept to face upward, when a finisher is connected.

JP 2001-075421 given below introduces an art of processing the image rotation, independently of the direction of the document to be set, wherein an image is formed on the transfer sheet placed in a fixed direction, and the direction of the set document (lateral direction or longitudinal direction) is adjusted, whereby an image is formed and the sheet is ejected.

Incidentally, when an image forming apparatus of this type is used, the transfer sheets with an image formed thereon are taken up in a bundle and are set on a separate cutting machine in some cases. In this case, when sheets are taken out of the image forming apparatus in the direction suited for being set on the cutting machine, the work efficiency is drastically improved.

The art disclosed JP 06-255283 and JP 2003-162101 is satisfactory to the extent of specifying the obverse or reverse side of the transfer sheet, and automatically rotating an image conforming to the stapling. However, it fails to arrange the direction of the image that facilitates removal of the transfer sheet.

According to the art described in JP 2001-075421, the direction of the transfer sheet is simply kept constant, independently of the direction of the original. It fails to provide the direction of the image that facilitates the re- setting of a bundle of transfer sheets on another finisher or to the removal of the bundle of transfer sheet.

SUMMARY OF THE INVENTION

To overcome the abovementioned drawbacks in conventional image-forming methods and apparatus, it is an object of the present invention to provide an image forming apparatus, designed in a simple structure, capable of forming an image, with consideration given to ensuring such a direction of the image as to facilitate removal of the transfer sheet.

Accordingly, to overcome the cited shortcomings, the abovementioned object of the present invention can be attained by image-forming methods and apparatus described as follow.

(1) A method for forming an image, comprising the steps of: reading an original image to generate image data of the original image; designating a first direction of the original image to be read in the reading step and a second direction of an output image to be ejected; applying image-processing, which includes an image-rotation processing, to the image data generated in the reading step, so as to generate processed image data; controlling a rotation angle to be employed for rotating the image data by the image-rotation processing, referring to the first direction and the second direction designated in the designating step, so that a direction of the output image coincides with the second direction designated in the designating step; and forming the output image based on the processed image data generated in the applying step.

(2) The method of item 1, wherein, in the controlling step, a transfer sheet, whose direction coincides with that of the output image to be ejected, is selected as a usable transfer sheet to be fed to an image-forming section.

(3) A method for forming an image in an image-forming apparatus to which a finishing apparatus is coupled, the finishing apparatus applying a finish processing to a transfer sheet on which an output image is formed, comprising the steps of: reading an original image to generate image data of the original image; designating a first direction of the original image to be read in the reading step, a second direction of an output image to be ejected and a third direction of the finish processing to be applied by the finishing apparatus; applying image-processing, which includes an image-rotation processing, to the image data generated in the reading step, so as to generate processed image data; controlling a rotation angle to be employed for rotating the image data by the image-rotation processing, referring to the first direction, the second direction and the third direction designated in the designating step; and forming the output image based on the processed image data generated in the applying step; wherein the rotation angle is controlled in the controlling step, so that a direction of the output image to be ejected coincides with the second direction and/or the third direction designated in the designating step in such a manner that the third direction overrides the second direction.

(4) The method of item 3, wherein, in the controlling step, a transfer sheet, whose direction coincides with that of the output image to be ejected and/or that of the third direction, is selected as a usable transfer sheet to be fed to an image-forming section.

(5) A method for forming an image in an image-forming apparatus to which a stack ejecting apparatus is coupled, the stack ejecting apparatus being capable of ejecting transfer sheets, on which output images are formed, by drawing a carrier, on which the transfer sheets are stacked, from a main frame of the stack ejecting apparatus, comprising the steps of: reading an original image to generate image data of the original image; designating a first direction of the original image to be read in the reading step; applying image-processing, which includes an image-rotation processing, to the image data generated in the reading step, so as to generate processed image data; controlling a rotation angle to be employed for rotating the image data by the image-rotation processing, referring to the first direction and a second direction of drawing the carrier from the stack ejecting apparatus, so that the second direction coincides with a top-to-bottom direction of the transfer sheets stacked on the stack ejecting apparatus; and forming the output images based on the processed image data generated in the applying step.

(6) The method of item 5, wherein, in the controlling step, a transfer sheet, whose direction coincides with that of the output image to be ejected or the second direction of drawing the carrier from the stack ejecting apparatus, is selected as a usable transfer sheet to be fed to an image-forming section.

(7) A method for forming an image in an image-forming apparatus to which a stack ejecting apparatus and a finishing apparatus are coupled, the stack ejecting apparatus being capable of ejecting transfer sheets, on which output images are formed, by drawing a carrier, on which the transfer sheets are stacked, from a main frame of the stack ejecting apparatus, while the finishing apparatus applying a finish processing to the transfer sheets, comprising the steps of: reading an original image to generate image data of the original image; designating a first direction of the original image to be read in the reading step and a second direction of the finish processing to be applied by the finishing apparatus; applying image-processing, which includes an image-rotation processing, to the image data generated in the reading step, so as to generate processed image data; controlling a rotation angle to be employed for rotating the image data by the image-rotation processing, referring to the first direction and the second direction designated in the designating step and a third direction of drawing the carrier from the stack ejecting apparatus; and forming the output image based on the processed image data generated in the applying step; wherein the rotation angle is controlled in the controlling step, so that a direction of the output image to be ejected coincides with the second direction and/or the third direction coincides with a top-to-bottom direction of the transfer sheets stacked on the stack ejecting apparatus in such a manner that the second direction overrides the third direction.

(8) The method of item 7, wherein, in the controlling step, a transfer sheet, whose direction coincides with that of the output image to be ejected, the second direction of the finish processing or the third direction of drawing the carrier from the stack ejecting apparatus, is selected as a usable transfer sheet to be fed to an image-forming section.

(9) An image-forming apparatus, comprising: a reading section to read an original image so as to generate image data of the original image; a designating section to designate a first direction of the original image to be read by the reading section and a second direction of an output image to be ejected; an image-processing section to apply image-processing, which includes an image-rotation processing, to the image data generated by the reading section, so as to generate processed image data; a controlling section to control a rotation angle to be employed for rotating the image data by the image-rotation processing, referring to the first direction and the second direction designated by the designating section, so that a direction of the output image coincides with the second direction designated by the designating section; and an image-forming section to form the output image based on the processed image data generated by the image-processing section.

(10) The image-forming apparatus of item 9, wherein the controlling section selects a transfer sheet, whose direction coincides with that of the output image to be ejected, as a usable transfer sheet to be fed to the image-forming section.

(11) An image-forming apparatus to which a finishing apparatus is coupled, the finishing apparatus applying a finish processing to a transfer sheet on which an output image is formed, the image-forming apparatus comprising: a reading section to read an original image so as to generate image data of the original image; a designating section to designate a first direction of the original image to be read by the reading section, a second direction of the output image to be ejected and a third direction of the finish processing to be applied by the finishing apparatus; an image-processing section to apply image-processing, which includes an image-rotation processing, to the image data generated by the reading section, so as to generate processed image data; a controlling section to control a rotation angle to be employed for rotating the image data by the image-rotation processing, referring to the first direction, the second direction and the third direction designated by the designating section; and an image-forming section to form the output image based on the processed image data generated by the image-processing section; wherein the controlling section controls the rotation angle, so that a direction of the output image coincides with the second direction and/or the third direction designated by the designating section in such a manner that the third direction overrides the second direction.

(12) The image-forming apparatus of item 11, wherein, in the controlling step, a transfer sheet, whose direction coincides with that of the output image to be ejected and/or that of the third direction, is selected as a usable transfer sheet to be fed to an image-forming section.

(13) An image-forming apparatus to which a stack ejecting apparatus is coupled, the stack ejecting apparatus being capable of ejecting transfer sheets, on which output images are formed, by drawing a carrier, on which the transfer sheets are stacked, from a main frame of the stack ejecting apparatus, the image-forming apparatus comprising: a reading section to read an original image so as to generate image data of the original image; a designating section to designate a first direction of the original image to be read by the reading section; an image-processing section to apply image-processing, which includes an image-rotation processing, to the image data generated by the reading section, so as to generate processed image data; a controlling section to control a rotation angle to be employed for rotating the image data by the image-rotation processing, referring to the first direction and a second direction of drawing the carrier from the stack ejecting apparatus, so that the second direction coincides with a top-to-bottom direction of the transfer sheets stacked on the stack ejecting apparatus; and an image-forming section to form the output images based on the processed image data generated by the image-processing section.

(14) The image-forming apparatus of item 13, wherein the controlling section selects a transfer sheet, whose direction coincides with that of the output image to be ejected or the second direction of drawing the carrier from the stack ejecting apparatus, as a usable transfer sheet to be fed to the image-forming section.

(15) An image-forming apparatus to which a stack ejecting apparatus and a finishing apparatus are coupled, the stack ejecting apparatus being capable of ejecting transfer sheets, on which output images are formed, by drawing a carrier, on which the transfer sheets are stacked, from a main frame of the stack ejecting apparatus, while the finishing apparatus applying a finish processing to the transfer sheets, the image-forming apparatus comprising: a reading section to read an original image so as to generate image data of the original image; a designating section to designate a first direction of the original image to be read by the reading section and a second direction of the finish processing to be applied by the finishing apparatus; an image-processing section to apply image-processing, which includes an image-rotation processing, to the image data generated by the reading section, so as to generate processed image data; a controlling section to control a rotation angle to be employed for rotating the image data by the image-rotation processing, referring to the first direction and the second direction designated by the designating section and a third direction of drawing the carrier from the stack ejecting apparatus; and an image-forming section to form the output image based on the processed image data generated by the image-processing section; wherein the controlling section controls the rotation angle, so that a direction of the output image to be ejected coincides with the second direction and/or the third direction coincides with a top-to-bottom direction of the transfer sheets stacked on the stack ejecting apparatus in such a manner that the second direction overrides the third direction.

(16) The image-forming apparatus of item 15, wherein the controlling section selects a transfer sheet, whose direction coincides with that of the output image to be ejected, the second direction of the finish processing or the third direction of drawing the carrier from the stack ejecting apparatus, as a usable transfer sheet to be fed to an image-forming section.

Further, according to the present invention, the following effects can be attained.

(1) When the direction of a scanned image and the direction of the image at the time of ejection have been specified, and image processing including image rotation is applied to the scanned image data, image formation is carried out by controlling the angle of rotation at the time of image rotation in image formation in such a way that the direction of the image at the time of ejection will conform to the specified direction, by referencing the specified direction of the scanned image and direction of the image at the time of ejection. This arrangement provides a simple structure capable of forming an image, with consideration given to ensuring such a direction of the image as to facilitate removal of the transfer sheet.

(2) When the direction of a scanned image, the direction of the image at the time of ejection and the direction subsequent to processing of finishing have been specified, and image processing including image rotation is applied to the scanned image data, image formation is carried out;

by controlling the angle of rotation at the time of image rotation in ejection image rotation control in such a way that the direction of the image at the time of ejection will conform to the specified direction; and by controlling the angle of rotation at the time of image rotation in finish processing image rotation control in such a way that the direction of finishing will conform to the specified direction;

wherein the rotation control for finish processing has precedence over the image rotation control for ejection. This arrangement provides a simple structure capable of forming an image, with consideration given to ensuring such a direction of the image as to facilitate removal of the transfer sheet, and allows complete processing of finishing where the direction is specified.

(3) When the direction of a scanned image has been specified, and image processing including image rotation is applied to the scanned image data, image formation is carried out by controlling the angle of rotation at the time of image rotation in image formation in such a way that the direction of removing the transfer sheet will be the downward direction of the image, by referencing the specified direction of the scanned image and direction of removing the transfer sheet. This arrangement provides a simple structure capable of forming an image, with consideration given to the direction of the image when removing the transfer sheet in stacking and ejection.

(4) When the direction of a scanned image has been specified, and image processing including image rotation is applied to the scanned image data, image formation is carried out;

by controlling the angle of rotation at the time of image rotation in finish processing image rotation control in such a way that the direction of the finish processing will conform to the specified direction; and by controlling the angle of rotation at the time of image rotation in image rotation control in such a way that the direction of removing the sheet will be the downward direction of the image;

wherein the image rotation control for finish processing has precedence-over the image rotation control for removal of the sheet. This arrangement provides a simple structure capable of forming an image, with consideration given to ensuring such a direction of the image as to facilitate removal of the transfer sheet, and allows complete processing of finishing where the direction is specified.

(5) Control is provided such a way as to select and feed the transfer sheet having the direction conforming to the direction in ejection, the direction of removing the transfer sheet or the direction of finishing, whereby ensuring smooth operation of each of the aforementioned control items:

BRIEF DESCRIPTION OF THE DRAWINGS

Other objects and advantages of the present invention will become apparent upon reading the following detailed description and upon reference to the drawings in which:

FIG. 3 is an explanatory diagram schematically representing the display and operation selection on the operation/display section in an embodiment of the present invention;

FIG. 4 is an explanatory diagram schematically representing the display and operation selection on the operation/display section in an embodiment of the present invention;

FIG. 5 is an explanatory diagram schematically representing the display and operation selection on the operation/display section in an embodiment of the present invention;

FIG. 14 is an explanatory diagram showing possible combinations between the direction of the document and transfer sheet due to the operation and various finishing operations in the embodiment of the present invention;

DETAILED DESCRIPTION OF THE PREFERRED EMBODIMENT

Referring to drawings, the following describes the details of the best form (hereinafter referred to as "embodiment") of the present invention.

<Electric Configuration of the Image Forming Apparatus and Overall Configuration>

Figure 1:
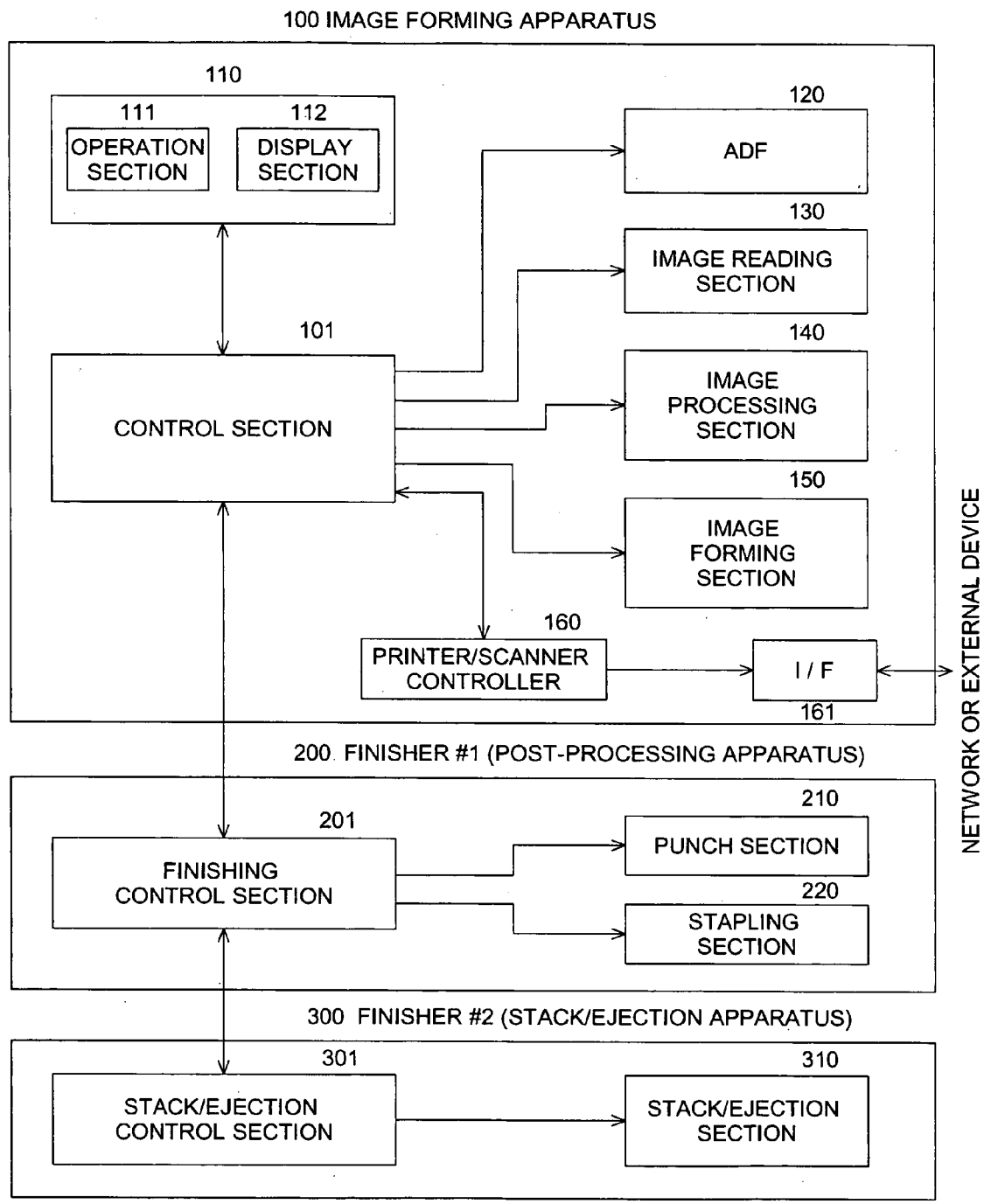
FIG. 1 is a functional block diagram representing the electric configuration of an image forming apparatus in an embodiment of the present invention.

FIG. 1 is a functional block diagram representing an example of the electric configuration between the image forming apparatus 100 in an embodiment of the present invention and finisher (#1) connected thereto.

To give a specific description of the embodiment, an image forming apparatus such as a copying machine equipped with an image reading section ill be used as an example for explanation. The same operation and effect are provided by using an image forming apparatus without an image reading section such as a printer.

In FIG. 1, numeral 100 denotes an image forming apparatus composed of the following sections. Numeral 101 is a control section as a control means for controlling each part of the image forming apparatus 100. Numeral 110 indicates an operation/display section 110 consisting of an operation section 111 and display section 112. In this case, the operation section 111 is used to select and specify the number of copies, enlargement ratio, reduction ratio, and type of the transfer sheet (A4, A4R, B5 and B5R). Further, it serves as a direction specifying means to specify various directions such as the direction of the document and image, direction of the image at the time of ejection, direction in finishing and direction of removal at the time of stack and ejection.

Numeral 120 indicates an automatic document sheet feed section (hereinafter referred to as "ADF"), which automatically feeds the sheets to the image reading section 130 to be described later. The ADF 120 can be designed to reverse the document to feed the image on the reverse side of the document to the image reading section. The ADF 120 can eject the document after automatically feeding one side (obverse side) of the document to the image reading section.

Numeral 130 is an image reading section (scanner) as an image reading means for optically reading the document and generating the image data. The numeral 140 indicates an image processing section as an image processing means for applying a predetermined image processing to the image data generated by the image reading section 130.

Numeral 150 is an image forming section as an image forming second for recording the image data having been subjected to image processing (forming an image). Numeral 160 denotes a printer scanner controller for handling the image data scanned by the image reading section 130 and the image data obtained from the interface 161 as an external interface.

The image processing section 140 processes not only the image data from the image reading section 130 but also the image data from the printer/scanner controller 160, whenever required.

Numeral 200 denotes a finisher (#1) as a finishing means for applying the processing of finishing (such as punching and stapling). In this case, the finisher (#1) 200 comprises a finishing control section 201 for controlling the finishing operation, a punch section 210 for controlling the punching operation, and a stapling section 220 for performing stapling. In this case, the finishing control section 201 finishing control while communicating with the control section 101 of the image forming apparatus 100 and the stack/ejection control section 301 of the finisher (#2) 300.

Numeral 300 indicates an finisher (#2) equipped with a stack/ejection section 310 including a truck as a stack/ejection means designed to take out the transfer sheet after pulling out, and a stack/ejection control section 301 for performing stack/ejection control. In this case, the stack/ejection control section 301 controls stack/ejection while communicating with the control section 101 of the image forming apparatus 100 and the finishing control section 201 of the finisher (#1) 200.

<Mechanical Configuration of the Image Forming Apparatus and Overall Operation>

Figure 2:
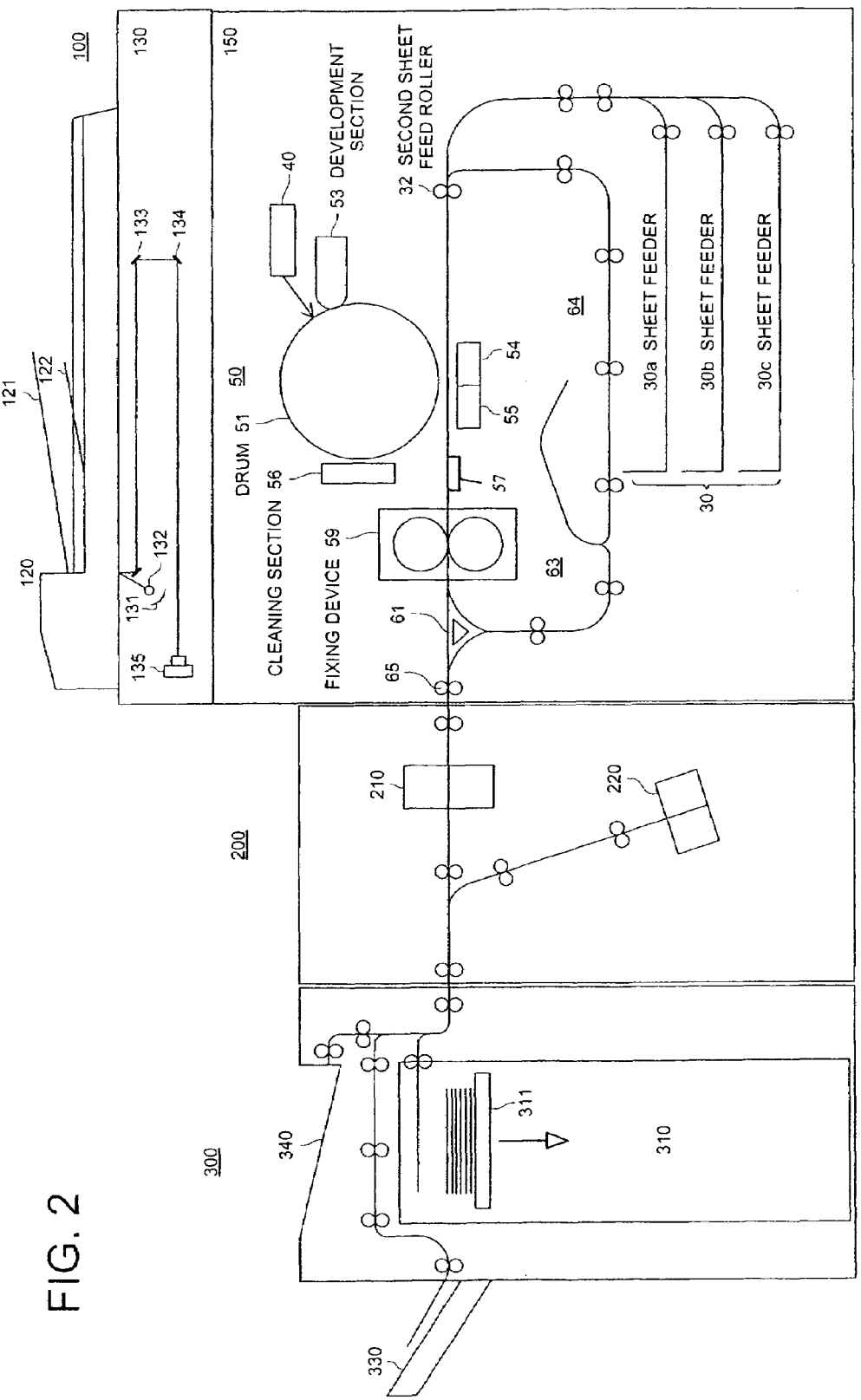
FIG. 2 is a configuration block diagram representing the mechanical configuration of the image forming apparatus in an embodiment of the present invention.

Referring to FIG. 2, the following describes the overall mechanical configuration and basic operations of the image forming apparatus of the present embodiment and the finisher connected thereto. With reference to FIG. 2, specific description will be given based on the concrete example where the finisher (#2) 300 and finisher (#1) 200 are connected to the image forming apparatus 100 are connected.

In FIG. 2, a plurality of documents "d", with the obverse side of the first page of the document facing upward, are placed on the tray 121 of the ADF 120.

At this time, in the image reading section 130, light from a light source 131 is reflected on the surface of the documents "d", and the reflected light forms an image on the light receiving surface of the CCD 135 as a photoelectric conversion means through mirrors 132 through 134 and image forming optical system. In this case, the light source 131, mirrors 132 through 134, the image forming optical system, the optical system including the CCD 135 and an optical system drive means (not illustrated) constitute an image reading section 130. In FIG. 2, when the documents "d" are placed on the platen glass with the scanned surface facing downward, the optical system scans along the platen glass and reads the contents.

When the documents "d" are automatically fed, documents are scanned with light source 131 and mirrors 132 through 134 secured under the second platen glass. The image data of the scanned documents "d" is sent from the CCD 135 to the image processing section 140 (not illustrated).

When the documents "d" are automatically fed by the ADF 120, the first page of the document is scanned and the winding operation is performed using a roller again through a reversing roller. The image on the reverse side of the document is ready by the image reading section 120, and is sent to the image processing section 140. In this manner, the documents "d" with the images on the obverse or reverse having been scanned are reversed again by the reversing roller and are stacked on the ejection tray 122 with the obverse side facing downward. In this way, the image data scanned by the image reading section 120 is subjected to predetermined image processing by the image processing section 140, and is stored in the image memory.

The transfer sheet P is unwound from any one of the sheet feeders 30a through 30c loaded with transfer sheets and is fed to the image forming section 50. The transfer sheet P having been sent to the image forming section 50 is synchronized by the second sheet feed roller (resist roller) 32 and is then brought closer to the drum 51.

It is also possible to arrange such a configuration as to provide an automatic paper selection (APS) function, wherein, when the document is placed or fed, or the image of the document is scanned, the document size is detected, and a sheet feed cassette containing the transfer sheets having the size conforming to the detected document size (the size of the transfer sheet obtained by multiplying by the scaling factor in the case of scaling, such as enlargement and reduction) is selected from a plurality of sheet feed cassettes, whereby the transfer sheet is fed. When the APS function is activated, suitable transfer sheets P is fed out according to this function.

When the image data is sent to the printing section 40 from the image processing section 140, laser light conforming to the image data is applied to the photoconductor drum 51 from the laser diode inside the image write section 40, thereby forming an electrostatic latent image. This electrostatic latent image is developed by the development section 53, and a toner image is formed on the photoconductor drum 51.

The toner image is transferred onto the transfer sheet P by the transfer section 54 below the photoconductor drum 51. The transfer sheet P pressed against the photoconductor drum 51 is separated by the separation section 55. The transfer sheet P separated from the photoconductor drum 51 enters the fixing section 59 through the conveyance mechanism 57 and the toner image is fixed by heat and pressure. When a double sided image is formed, an image on the reverse side (image on the second page) is formed on the transfer sheet P in this phase.

When a single sized image is formed, the transfer sheet P with a toner image fixed thereon is ejected out of the machine by the ejection roller 65 in conformity to the output format of the finishers (finisher (#1) 200 and finisher (#2) 300) to be described later, directly or after being reversed again by the reversing section 63.

When a double sized image is formed, the transfer sheet P is fed downward through a guide 61 to enter the reversing section 63. Then the transfer sheet P in the reversing section 63 is again unwound by the reversing roller, and is sent to the image forming section 50 through the reverse conveyance path 64.

In the image forming section 50 having completed formation of the image of the reverse side of the document "d", the toner attached to the photoconductor drum 51 is removed by the cleaning section 56 and electrostatic charging is provided by a charging section to get ready for the subsequent process of image formation.

Under this condition, the obverse side of the transfer sheet P (without image being formed thereon) is carried into the image forming section 50, and an image of the obverse side (image of page 1) is formed. The transfer sheet P having been separated from the photoconductor drum 51 by the separation section 55 again enters the fixing section 59 through the conveyance mechanism 57, where the image is fixed on the transfer sheet P.

As described above, the transfer sheet P with images of the obverse and reverse sides having been formed is ejected out of the machine (to the finisher (#1) to be described later) by the ejection roller 65 in conformity to the output format of the finishers (finisher (#1) 200 and finisher (#2) 300) to be described later, directly or after being reversed again by the reversing section 63.

In the finisher (#1) 200, the sheet is punched at the specified position by the punch section 210 according to the processing of finishing determined in advance, or is subjected to stapling by the stapling section 220.

In the finisher (#2) 300, the transfer sheets with the image formed thereon by the image forming apparatus 100 are sequentially stacked on the stack/ejection tray 311. In this case, as transfer sheets are stacked, the stack/ejection tray 311 is lowered gradually. Means are provided in such a way that, while the transfer sheets are stacked, the stack/ejection section 310 (including the stack/ejection tray 311) is pulled out on the side facing the operator in the direction vertical to the sheet, and thereafter the transfer sheet can be taken out, for example. The transfer sheets not stacked on the stack/ejection tray 311 are ejected to the main tray 330 or sub-tray 340.

FIG. 3 is an explanatory diagram representing an example of the display and operation selection on the operation/display section 110. FIG. 3 gives an example of the screen where the document setting direction, document image quality (image quality) and presence/absence of a special document (special image) are selected. As related to the present embodiment, the operator selects any one of the four types indicated by the direction of the document (direction of the image specified on the document), and presses the "OK" icon, as shown in the document setting direction of FIG. 3. The document image quality (image quality) and presence/absence of a special document (special image) are also selected by the operator.

FIG. 4 is an explanatory diagram schematically representing the display and operation selection on the operation/display section 110. In this case, as shown in FIG. 4, the operator can select one of the indicated items in each of the following modes for finishing (finisher mode); the ejection tray (main tray 330 or sub-tray 340), double sided binding direction (lateral or vertical binding), stapling position on the transfer sheet (left top, right top, left, top), and main tray finishing (grouping, sorting, saddle binding, double folding, insertion of cover sheet, punching, folding in the shape of a letter Z and folding in three).

When the [Select where to eject] ion is pressed through the display and operation selection of the operation/display section 110 shown in FIG. 4, the stack/ejection tray 311 of the finisher (#2) 300—not the main tray 330 or sub-tray 340—is selected as the destination where sheets are ejected.

When the [Set the top position] ion is pressed in the display and operation selection of the operation/display section 110 shown in FIG. 4, the display and operation selection in FIG. 5 is displayed as a pop-up window.

The term "top position" as used herein is an expression indicating the upper position of the image when setting the direction of the image of the transfer sheet at the time of ejection, by way of an example. It shows how the image is recorded on the transfer sheet at the time of ejection. As related to the present embodiment, the operator selects any one of the four types shown in the top position of FIG. 5 and presses the [OK] icon.

Figure 6:
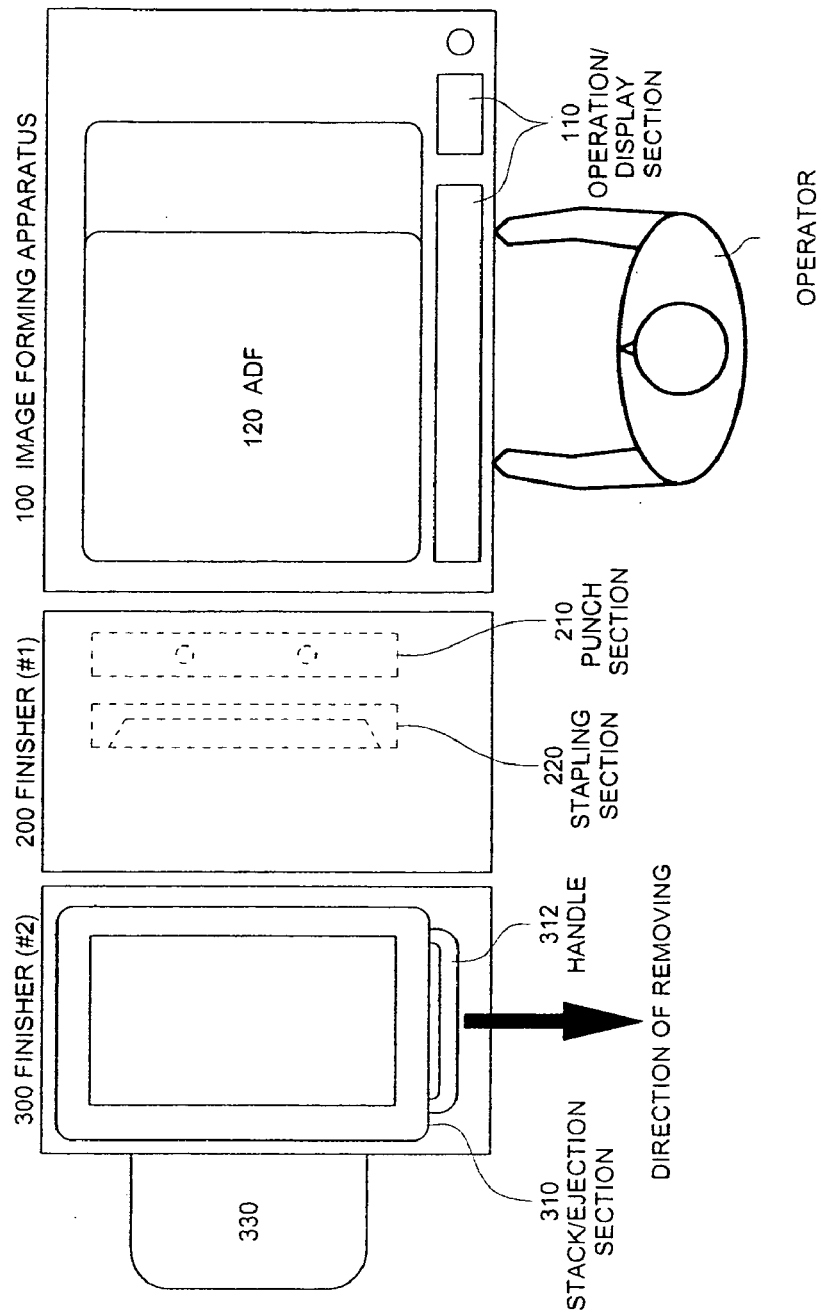
FIG. 6 is a configuration block diagram representing the configuration of the image forming apparatus in an embodiment of the present invention.

FIG. 6 schematically shows the image forming apparatus 100, finisher (#1) 200 and finisher (#2) 300 shown in FIG. 2, as viewed from above the operator. The stack/ejection section 310 of the finisher (#2) 300 is designed in the form of a truck. With a plurality of transfer sheets loaded on the stack/ejection tray 311, it is lowered to the lowest point, and the operator holds the handle 312 and pulls it out toward the operator.

Figure 7:
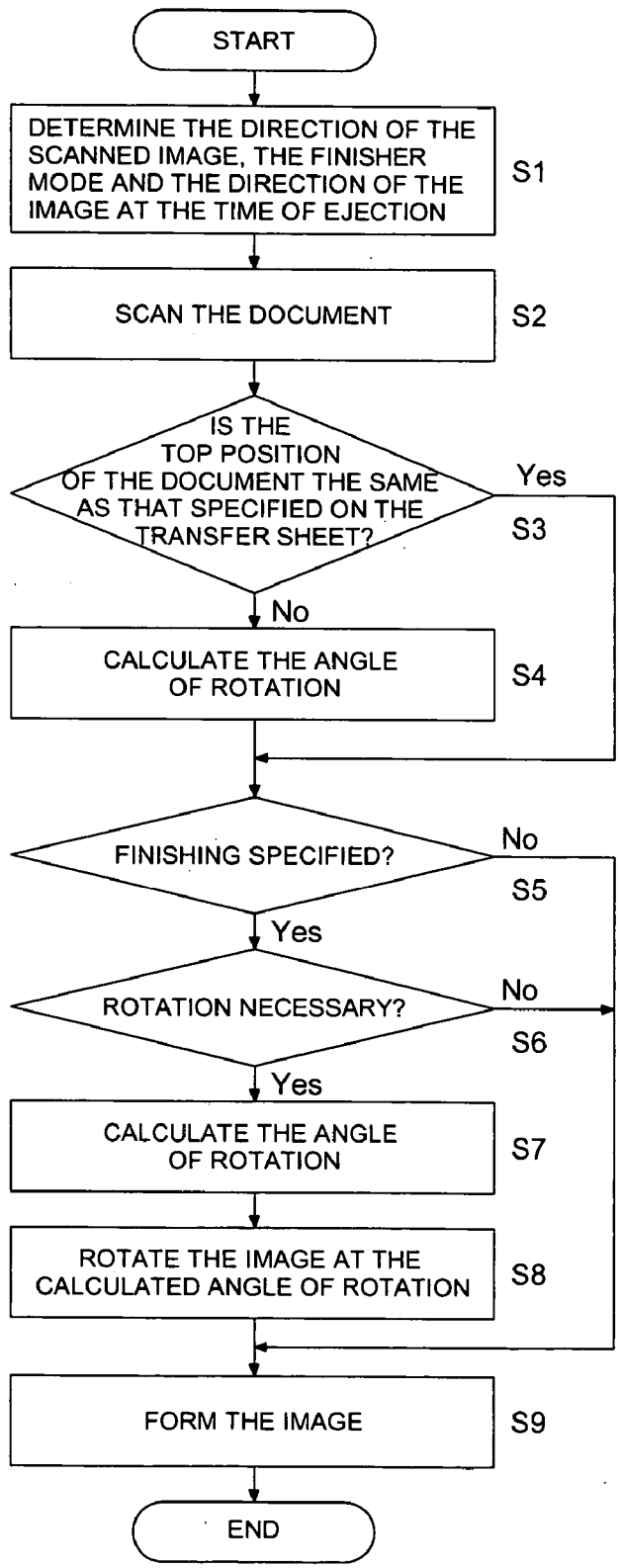
FIG. 7 is a flowchart representing the operation of the image forming apparatus in an embodiment of the present invention.

Referring to the flowchart of FIG. 7, the following describes the details of the operation of the image forming apparatus for forming an image in the present invention, together with the operation of the finishers (finisher (#1) 200 and finisher (#2) 300).

In the first place, the operator sets the document direction, document image quality (image quality) and presence/absence of a special document (special image), through the display screen and the operation selection screen in the operation/display section 110 shown in FIG. 3.

In the same manner, the operator sets the following items through the display screen and operation selection screen in the operation/display section 110 shown in FIG. 4;
the finisher mode (finishing mode),
the ejection tray (main tray 330 or sub-tray 340),
the double side binding direction (lateral binding, vertical binding),
the stapling position (left top, right top, left, top) on the transfer sheet,
main tray finishing (grouping, sorting, saddle binding, double folding, insertion of cover sheet, punching, folding in the shape of a letter Z, folding in three). (See S1 in FIG. 7).

In this embodiment, the operator selects the [Set the top position] in the setting of the finisher mode of FIG. 4. The direction of the image of the transfer sheet at the time of ejection is also set on the screen of the direction of top position shown in FIG. 5. When the [Set the top position] is not selected in FIG. 4, the image facing upward shown on the top as an alternative in the direction of top position is assumed to have been selected as the standard status.

The document placed on the tray 121 of the ADF 120 is automatically fed by the ADF 120, and the image is scanned by the image reading section 130, thereby generating the image data conforming to the document image (S2 in FIG. 7).

The control section 101 checks the direction of the scanned image specified by the operation/display section 110 and the direction of the image at the time of ejection specified in FIG. 5. If these directions (e.g. top positions of the both) fail to agree with each other No in S3 of FIG. 7), then the image processing of image rotation is required. If the image processing of image rotation has been assumed as necessary, the control section 101 calculates the angle of rotation required for image processing of rotating the image data so as to agree with the direction of the image at the time of ejection specified (S4 in FIG. 7).

Figure 9:
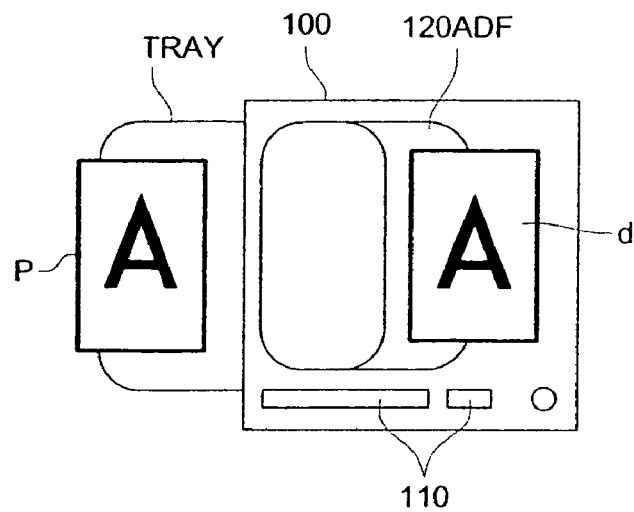
FIG. 9(a) and FIG. 9(b) are explanatory diagrams showing examples of the direction of the document and transfer sheet due to the operation of the embodiment of the present invention.
Figure 9:
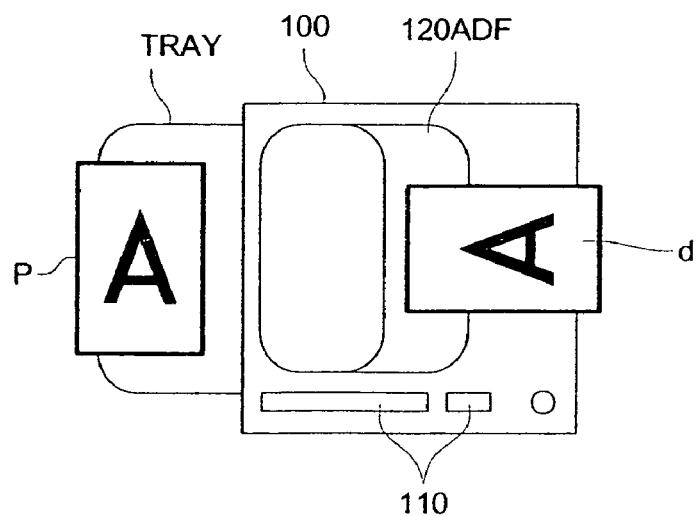

FIG. 9(a) shows the case where the direction of the document "d" specified by the operation/display section 110 agrees with the direction of the transfer sheet P at the time of ejection specified, as viewed from above the operator, wherein the position closer to the operator is located downward in the drawing, similarly to the case of FIG. 6. In this case, rotation of the image is not required. To simplify the description, the finisher (#1) 200 and finisher (#2) 300 are omitted from the illustration.

FIG. 9(b) shows the case where the direction of the document "d" specified by the operation/display section 110 does not agree with the direction of the transfer sheet P at the time of ejection specified, as viewed from above the operator, wherein the position closer to the operator is located downward in the drawing, similarly to the case of FIG. 6. In this case, the image is rotated by an angle of minus 90 degrees (270 degrees) in the processing of image rotation.

The aforementioned arrangement provides a simple structure capable of forming an image, with consideration given to ensuring such a direction of the image as to facilitate removal of the transfer sheet. Thus, for example, when the transfer sheets with an image formed thereon are taken up in a bundle and are set on a separate cutting machine to be cut thereby, sheets can be taken out of the image forming apparatus in the direction suited for being set on the cutting machine, with the result that the work efficiency is drastically improved.

The control section 101 checks whether or not the finishing is specified or not through the specification of the finisher mode of the operation/display section 110 shown in FIG. 4 (S5 in FIG. 7). If the finishing has been specified, Yes in S5 of FIG. 7), the control section 101 further checks the specified direction of the scanned image and the specified finishing, and determines if the requested position specified to be finished (staple position or punch position) and the position where finishing is possible (position that can be punched by the punch section 210 and stapled by the stapling section 220) agree with each other (S6 in FIG. 7).

In the finisher (#1) 200, when the position where punching or stapling can be performed (position where finishing is possible) does not cover all the edges of the transfer sheet, namely, when punching or stapling is to be performed on two or more positions, the punching or stapling can be performed on the edge of the transfer sheet orthogonal to the direction of conveyance (FIG. 6). This is confirmed.

When the requested position specified to be finished does not agree with the position where finishing is possible, and the image must be rotated (Yes in S6 of FIG. 7), the control section 101 calculates the angle of rotation required for image processing of rotating the image data to ensure that the requested position specified to be finished will agree with the position where finishing is possible (S7 in FIG. 7).

Figure 10:
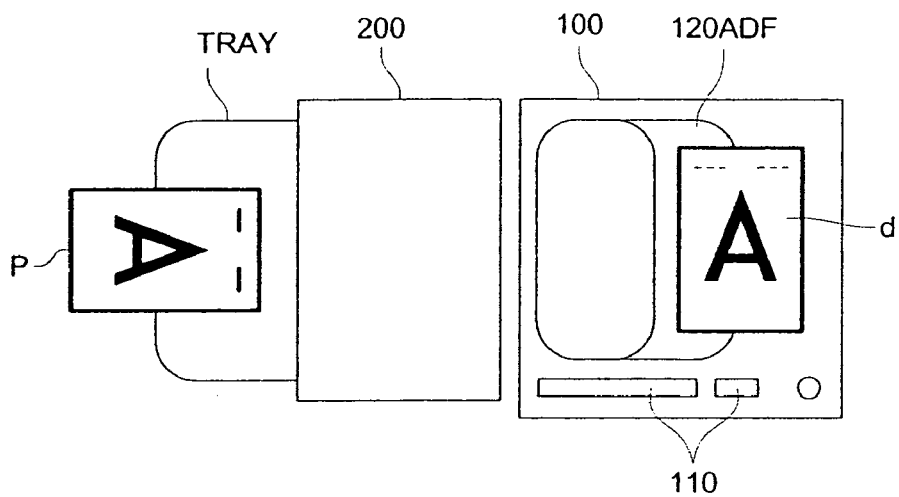
FIG. 10(a) and FIG. 10(b) are explanatory diagrams showing examples of the direction of the document and transfer sheet due to the operation of the embodiment of the present invention.
Figure 10:
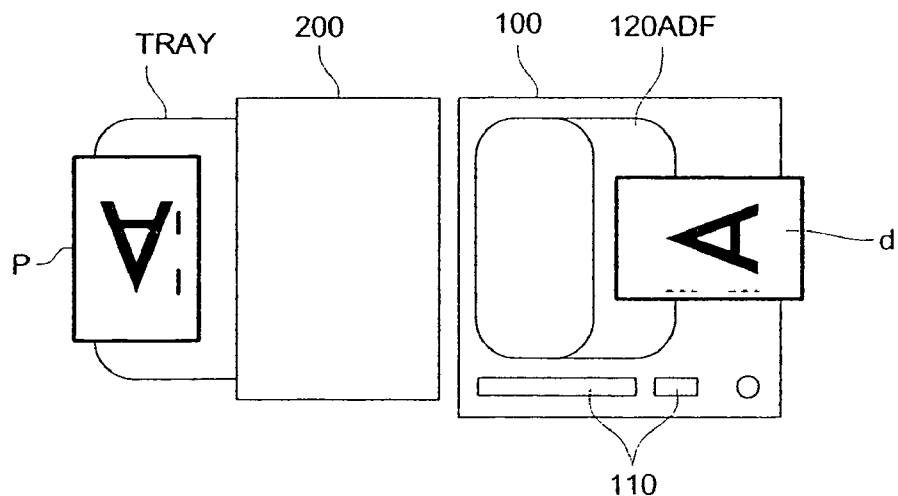

FIG. 10 is an explanatory diagram showing the direction of the documents "d" specified by the operation/display section 110, the requested position to be finished in the documents "d" (indicated by broken line) and the transfer sheet P finished at the position where finishing is possible, as viewed from above the operator, wherein the position closer to the operator is located downward in the drawing, similarly to the case of FIG. 6.

FIG. 10(a) shows the direction of the documents "d" specified by the operation/display section 110, wherein the requested position to be finished (binding at two positions stapled on the top of the portrait image) and the position where finishing is possible do not agree with each other. In this case, the image is rotated by an angle of minus 90 degrees (270 degrees) in the processing of image rotation. FIG. 10(b) shows the direction (portrait image) of the documents "d" specified by the operation/display section 110, wherein the requested position to be finished (binding at two positions stapled on the left of the portrait image) and the position where finishing is possible do not agree with each other. In this case, the image is rotated by an angle of 90 degrees in the processing of image rotation.

The control section 101 applies the processing of image rotation, based on the calculated angle of rotation, in order to ensure that the direction of the image at the time of ejection will conform to the specified direction, or the specified detection of the documents "d" and the requested position to be finished in the documents "d" will agree with the position where finishing is possible (S8 in FIG. 7). In this manner, the image forming section 150 forms images based on the data of image which rotation processing is carried out.

When the processing of image rotation is applied, and the angle of rotation calculated for the direction of the transfer sheet at the time of ejection (S4 in FIG. 7) is different from that calculated for the position where finishing is possible (S7 in FIG. 7), priority is given to the angle of rotation calculated for the position where finishing is possible. To put it another way, when the angle of rotation in image rotation is controlled in the control of image rotation at the time of ejection, in such a way that the direction of the image at the time of ejection will be the specified direction, and when the angle of rotation in image rotation is controlled in the control of image rotation at the time of finishing, in such a way that the direction of the finishing will be the specified one, priority is given to the control of image rotation at the time of finishing (control shown in FIGS. 10(a) and 10(b)) over the control of image rotation at the time of ejection (control shown in FIGS. 9(a) and 9(b)). This arrangement ensures processing of finishing without fail.

The aforementioned arrangement provides a simple structure capable of forming an image, with consideration given to ensuring such a direction of the image as to facilitate removal of the transfer sheet. Thus, for example, when the transfer sheets with an image formed thereon are taken up in a bundle and are set on a separate cutting machine to be cut thereby, sheets can be taken out of the image forming apparatus in the direction suited for being set on the cutting machine, with the result that the work efficiency is drastically improved. Further, if there is any processing of specified finishing, the processing can be implemented without fail.

Figure 8:
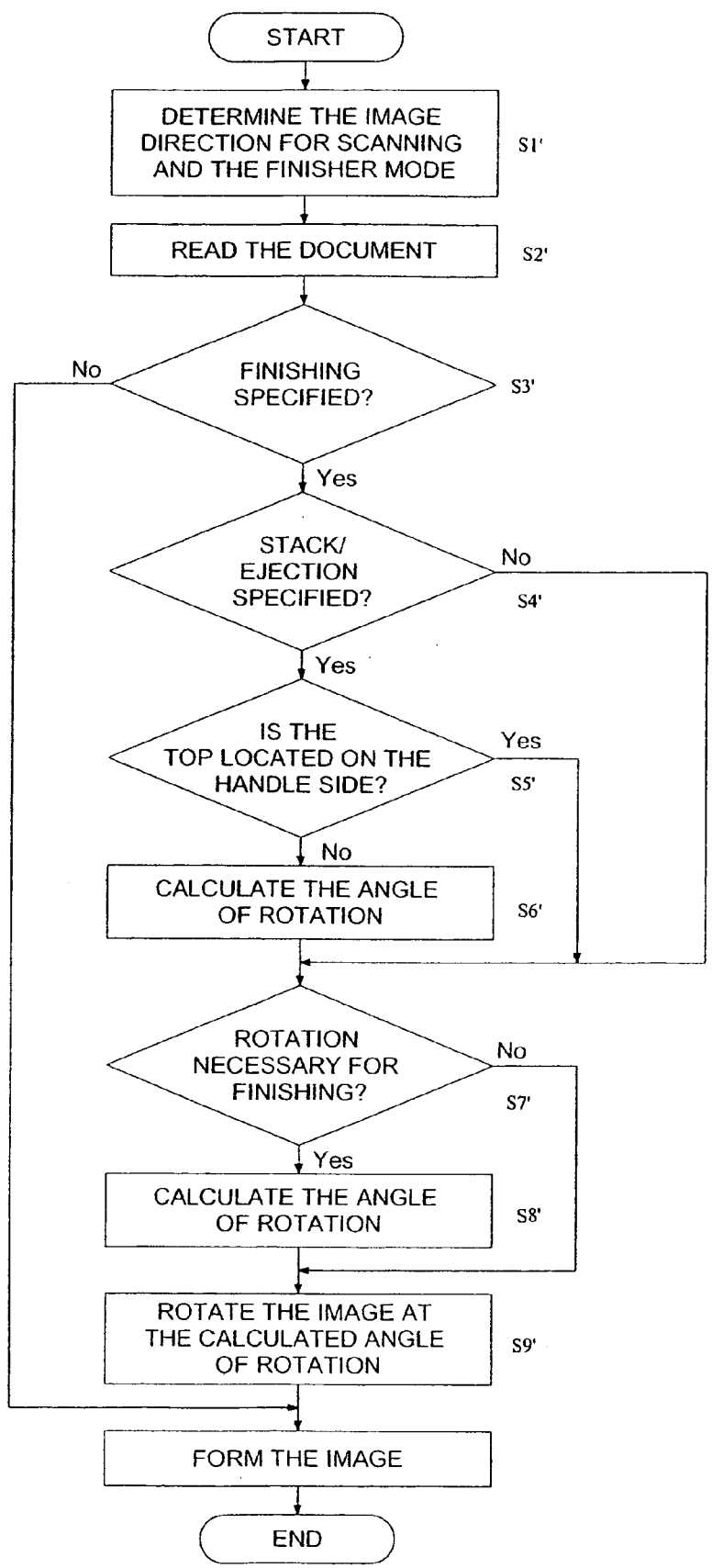
FIG. 8 is a flowchart representing the operation of the image forming apparatus in an embodiment of the present invention.

Referring to the flowchart of FIG. 8, the following describes the operation of the image forming apparatus for forming an image in the present embodiment (finisher (#1) 200 through finisher (#2) 300).

The operator sets the document setting direction (direction of the document) or the direction of the image, document image quality (image quality) and presence/absence of a special document through the display screen and operation selection screen in the operation/display section 110 shown in FIG. 3.

In the similar manner, the operator sets the following items through the display screen and operation selection screen in the operation/display section 110 shown in FIG. 4;
the finisher mode (finishing mode),
the ejection tray (main tray 330 or sub-tray 340), the double side binding direction (lateral binding, vertical binding),
the stapling position (left top, right top, left, top) on the transfer sheet,
main tray finishing (grouping, sorting, saddle binding, double binding, insertion of cover sheet, punching, Folding in the shape of a letter Z, folding in three). (See S1' in FIG. 8).

In this embodiment, the [Select where to eject] ion is pressed by the operator through the display and operation selection of the operation/display section 110 shown in FIG. 4, the stack/ejection tray 311 of the finisher (#2) 300—not the main tray 330 or sub-tray 340—is selected as the destination where sheets are ejected.

In this case, the document placed on the tray 121 of the ADF 120 is automatically fed by the ADF 120, and the image is scanned by the image reading section 130, thereby generating the image data conforming to the document image (S2' in FIG. 8).

The control section 101 checks the direction of the scanned image specified by the operation/display section 110 shown in FIG. 3 and the direction of the image at the time of ejection specified in FIG. 5. If these directions (e.g. top positions of the both) flail to agree with each other (N in S3' of FIG. 8), then the image processing of image rotation is required. If the image processing of image rotation has been assumed as necessary, the control section 101 calculates the angle of rotation required for image processing of rotating the image data so as to agree with the direction of the image at the time of ejection specified (S4' in FIG. 8).

FIG. 9(a) shows the case where the direction of the document "d" specified by the operation/display section 110 agrees with the direction of the transfer sheet P at the time of ejection specified, as viewed from above the operator, wherein the position closer to the operator is located downward in the drawing, similarly to the case of FIG. 6. In this case, rotation of the image is not required. To simplify the description, the finisher (#1) 200 and finisher (#2) 300 are omitted from the illustration.

FIG. 9(b) shows the case where the direction of the document "d" specified by the operation/display section 110 does not agree with the direction of the transfer sheet P at the time of ejection specified, as viewed from above the operator, wherein the position closer to the operator is located downward in the drawing, similarly to the case of FIG. 6. In this case, the image is rotated by an angle of minus 90 degrees (270 degrees) in the processing of image rotation.

The aforementioned arrangement provides a simple structure capable of forming an image, with consideration given to ensuring such a direction of the image as to facilitate removal of the transfer sheet. Thus, for example, when the transfer sheets with an image formed thereon are taken up in a bundle and are set on a separate cutting machine to be cut thereby, sheets can be taken out of the image forming apparatus in the direction suited for being set on the cutting machine, with the result that the work efficiency is drastically improved.

The control section 101 checks whether or not the finishing is specified through the specification of the finisher mode of the operation/display section 110 shown in FIG. 4. (S3' in FIG. 8). It further checks whether or not the finisher (#2) 300 is specified through the specification of the destination of ejection on the operation/display section 110 shown in FIG. 4 (S4' of FIG. 8).

The direction of the transfer sheet P at the time of ejection is determined with consideration given to the direction of taking out the transfer sheet from the stack/ejection tray 311 of the finisher (#2) 300, and the angle of rotation is calculated in such a way that the transfer sheet P will be ejected from below the image closer to the operator when removed by the operator (S5' and S6' in FIG. 8).

Figure 11:
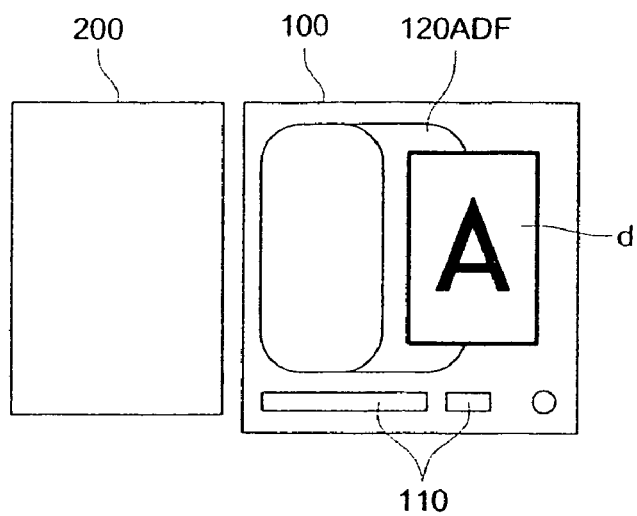
FIG. 11(a) and FIG. 11(b) is are explanatory diagrams showing examples of the direction of the document and transfer sheet due to the operation of the embodiment of the present invention.
Figure 11:
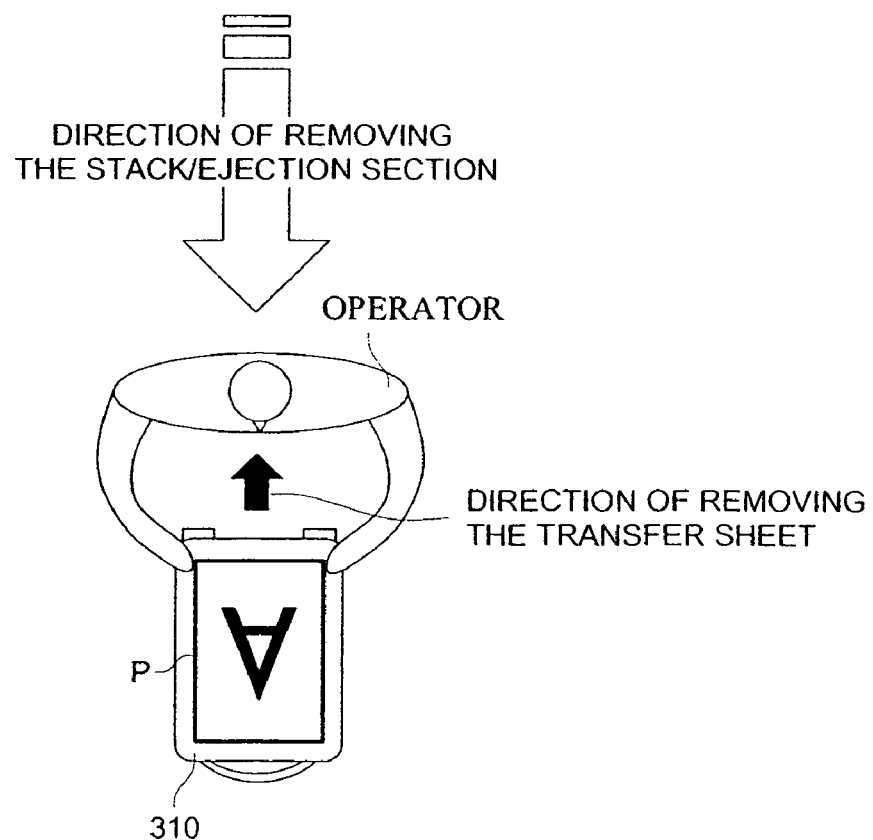

FIG. 11(a) shows the case where the transfer sheet P is stacked and ejected onto the finisher (#2) 300, as viewed from above the operator, wherein the position closer to the operator is located downward in the drawing, similarly to the case of FIG. 6. In this case, the stack/ejection section 310 is pulled out so as to pull the handle 312. In the example shown in this diagram, the transfer sheet P is taken out to the side opposite to the handle 312 of the stack/ejection section 310, as shown in FIG. 11(b). The angle of rotation is calculated in such a way that the transfer sheet P will be ejected from below the image closer to the operator.

Figure 12:
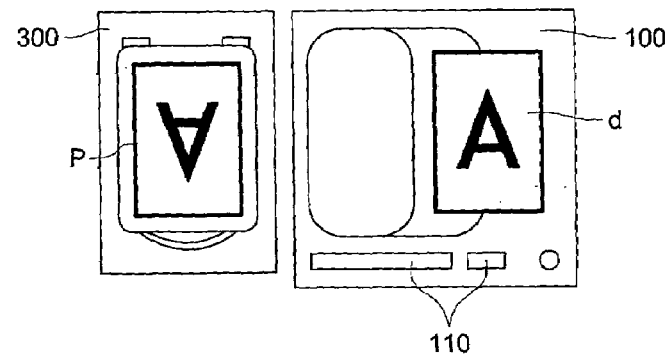
FIG. 12(a), FIG. 12(b), FIG. 12(c) and FIG. 12(d) are explanatory diagrams showing examples of the direction of the document and transfer sheet due to the operation of the embodiment of the present invention.
Figure 12:
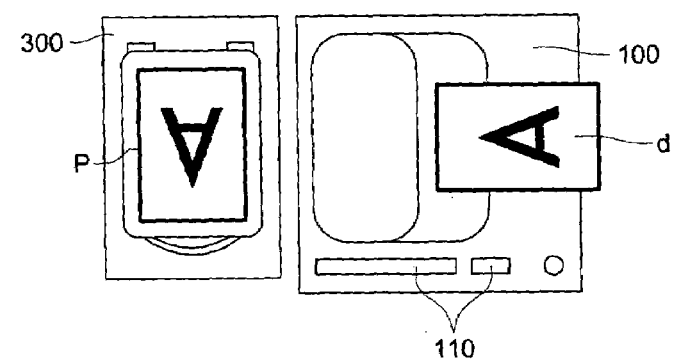
Figure 12:
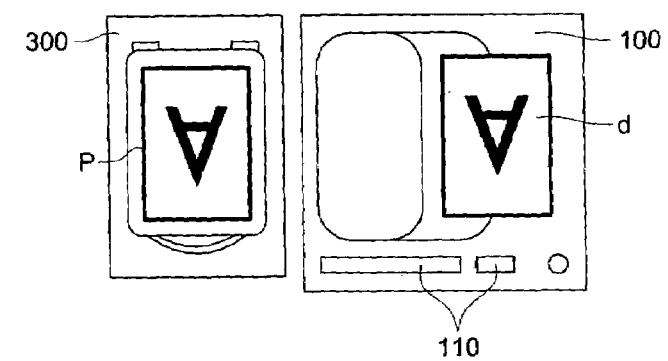
Figure 12:
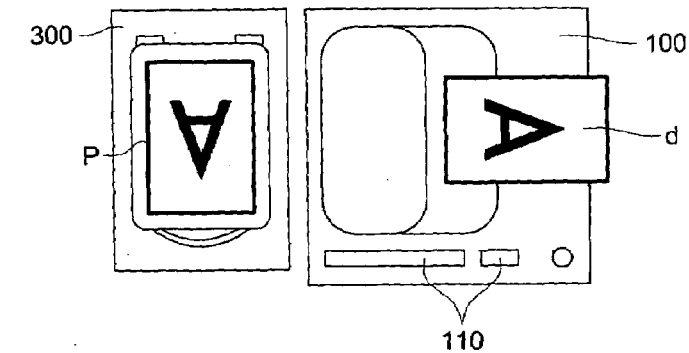

In the aforementioned case, as shown in FIG. 12(a), the rotation of the image is 180 degrees. In the example shown in FIG. 12(b), the rotation of the image is 90 degrees. In the example shown in FIG. 12(c), the rotation of the image is not required. Further, in the example shown in FIG. 12(d), the image is rotated by an angle of minus 90 degrees (270 degrees) in the processing of image rotation.

If the pulling direction of the stack/ejection section 310 or the direction of taking out the transfer sheet P from the stack/ejection section 310 is different, the control section 101 determines the angle of rotation in the processing of image rotation in conformity to the direction. This arrangement provides a simple structure capable of forming an image, with consideration given to the direction of the image when taking out in the processing of stacking and ejection.

When the finishing is specified (Yes in S3' of FIG. 8), reference is made to the specified direction of the scanned image and specified finishing, independently of whether or not the stack/ejection (S4' in FIG. 8) and the top position (S5' in FIG. 8) are specified. Evaluation is made to determine whether or not the requested position specified to be finished (stapled or punched position) agrees with the position where finishing is possible (position punched by the punch section 210 and stapled by the stapling section 220) (S7' in FIG. 8).

If the requested position to be finished does not agree with the position where finishing is possible, and processing of image rotation is necessary (Yes in S7' of FIG. 8), the control section 101 calculates the angle of rotation required for the image processing of rotating the image data in such a way that the requested position specified to be finished will agree with the position where finishing is possible (S8' in FIG. 8).

FIGS. 13(a)–13(d) show the relationship among the direction of the documents "d" specified by the operation/display section 110, the requested position to be finished in the documents "d" (indicated by broken line) and the transfer sheet P finished at the position where finishing is possible. FIGS. 13(a)–13(d) show the direction of the documents "d", which is the same as that in FIGS. 12(a)–12(d).

Figure 13:
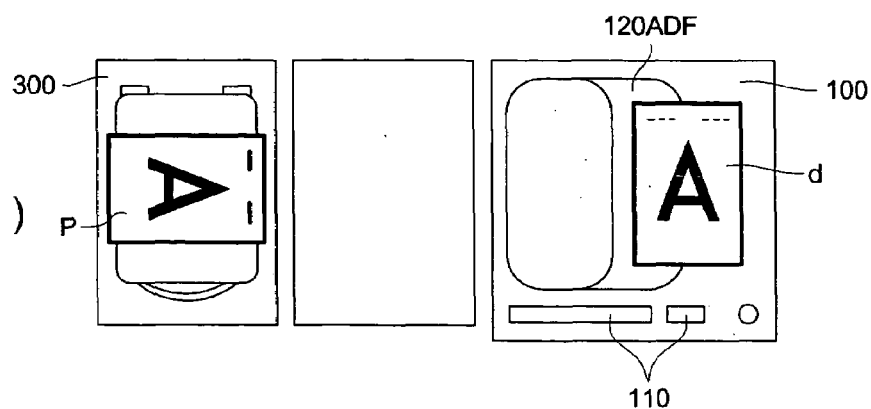
FIG. 13(a), FIG. 13(b), FIG. 13(c) and FIG. 13(d) are explanatory diagrams showing examples of the direction of the document and transfer sheet due to the operation of the embodiment of the present invention.
Figure 13:
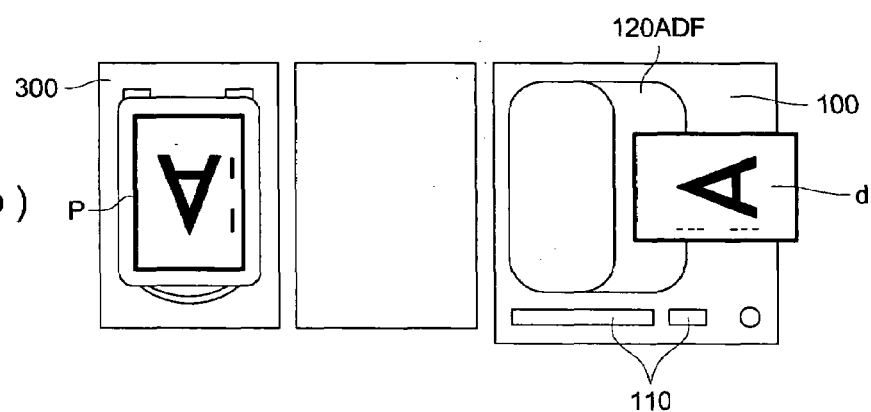
Figure 13:
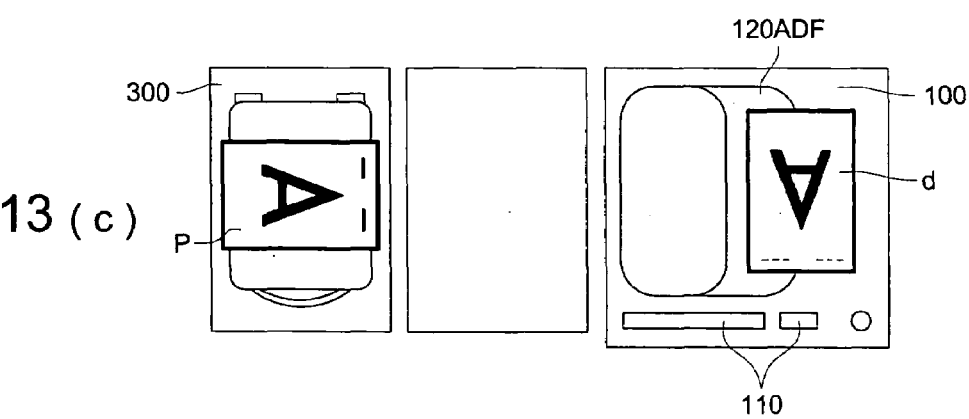
Figure 13:
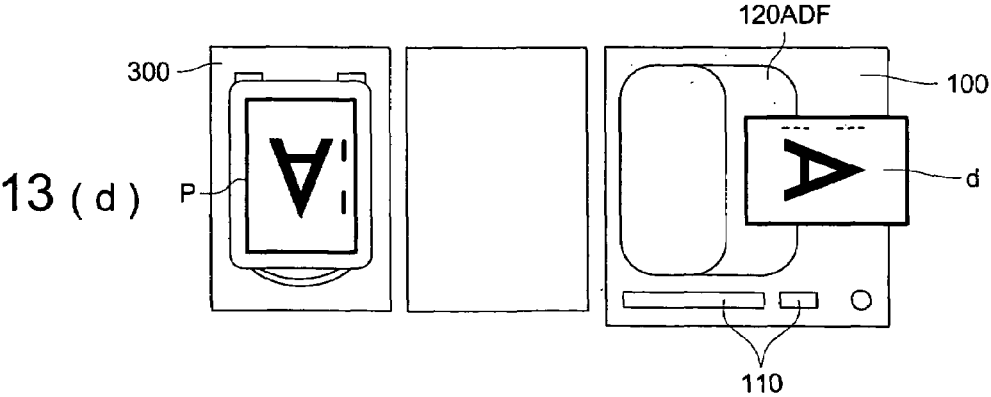

In this case, the angle of rotation is 270 degrees (minus 90 degrees) in the processing of image rotation shown in FIG. 13(a). The angle of rotation is 90 degrees in the processing of image rotation shown in FIG. 13(b). In the example shown in FIG. 13(c), the angle of rotation is also 90 degrees. In the example shown in FIG. 13(d), the angle of rotation is minus 90 degrees (270 degrees).

The control section 101 applies the processing of image rotation, based on the calculated angle of rotation, in order to ensure that the direction of the transfer sheet at the time of ejection by the finisher (#2) 300 will conform to the specified direction, or the specified direction of the documents "d" and the requested position to be finished in the documents "d" will agree with the position where finishing is possible (S9' in FIG. 8). In this manner, the image forming section 150 forms images based on the data of image which rotation processing is carried out.

When the processing of image rotation is applied, if the angle of rotation calculated (S6' in FIG. 8) for the direction of the transfer sheet at the time of stacking and ejection is different from that calculated (S8' in FIG. 8) for the position where finishing is possible (FIGS. 12(a) and 13(a) and FIGS. 12(c) and 13(c)), priority is given to the angle of rotation calculated for the position where finishing is possible. To put it another way, when the angle of rotation in image rotation is controlled in the control of image rotation at the time of ejection, in such a way that the direction of the image at the time of stacking and ejection will be the specified direction, and when the angle of rotation in image rotation is controlled in the control of image rotation at the time of finishing, in such a way that the direction of the finishing will be the specified one, priority is given to the control of image rotation at the time of finishing (control shown in FIGS. 13(a)–13(d)) over the control of image rotation at the time of ejection (control shown in FIGS. 12(a)–12(d)). This arrangement ensures processing of finishing without fail.

The aforementioned arrangement provides a simple structure capable of forming an image, with consideration given to ensuring such a direction of the image as to facilitate removal of the transfer sheet at the time of stacking and ejection. Thus, for example, when the transfer sheets with an image formed thereon are taken up in a bundle and are set on a separate cutting machine to be cut thereby, sheets can be taken out of the image forming apparatus in the direction suited for being set on the cutting machine, with the result that the work efficiency is drastically improved. Further, if there is any processing of specified finishing, the processing can be implemented without fail.

FIG. 14 is an explanatory drawing listing up the restrictions (presence/absence of image processing) imposed on the implementation of the processing of stapling and punching in the operation shown in the flowchart of FIG. 7. When processing of image rotation is applied, FIG. 14 also shows whether or not the rotation for which calculation has been made for the position where finishing is possible (S7 in FIG. 7) has precedence over the rotation for which calculation has been made for the transfer sheet at the time of ejection.

In FIG. 14, LEF stands for Long Edge Feed, wherein the long edge is read by the ADF. SEF stands for Short Edge Feed, wherein the short edge is read by the ADF. The portrait refers to the transfer sheet placed in vertical orientation, with an image recorded thereon. The landscape refers to the transfer sheet placed in horizontal orientation, with an image recorded thereon. Punch (right or left) can be defined as punching on the right or left of the transfer sheet. Punch (top) refers to punching on the top potion of the image on the transfer sheet. The staple (two positions on left) can be defined as stapling on the two positions on the left of the image on the transfer sheet. The staple (two positions on top) refers to stapling on the two positions on the top portion of the image on the transfer sheet. The circles shown in FIG. 14 indicate the processing that can be applied, while cross marks "x" denote the processing that cannot be applied.

[Other Embodiments]

In the aforementioned description, various forms of processing are applied to the image obtained from the document scanned by the image reading section of the copying machine. The same forms of processing can be applied the image supplied from the outside via the network, thereby achieving the same operation and effect. In this case, the "direction of the document" in the aforementioned embodiment should be read as "direction of the image".

Disclosed embodiment can be varied by a skilled person without departing from the spirit and scope of the invention.

What is claimed is:

1. A method for forming an image in an image-forming apparatus to which a finishing apparatus is coupled, said finishing apparatus applying a finish processing to a transfer sheet on which an output image is formed, comprising the steps of:
reading an original image to generate image data of said original image;
designating a first direction of said original image to be read in said reading step, a second direction of an output image to be ejected and a third direction of said finish processing to be applied by said finishing apparatus;
applying image-processing, which includes an image-rotation processing, to said image data generated in said reading step, so as to generate processed image data;
controlling a rotation angle to be employed for rotating said image data by said image-rotation processing, referring to said first direction, said second direction and said third direction designated in said designating step; and
forming said output image based on said processed image data generated in said applying step;
wherein said rotation angle is controlled in said controlling step, so that a direction of said output image to be ejected coincides with said second direction and/or said third direction designated in said designating step in such a manner that said third direction overrides said second direction.

2. The method of claim 1, wherein, in said controlling step, a transfer sheet, whose direction coincides with that of said output image to be ejected and/or that of said third direction, is selected as a usable transfer sheet to be fed to an image-forming section.

3. A method for forming an image in an image-forming apparatus to which a stack ejecting apparatus is coupled, said stack ejecting apparatus being capable of ejecting transfer sheets, on which output images are formed, by drawing a carrier, on which said transfer sheets are stacked, from a main frame of said stack ejecting apparatus, comprising the steps of:
reading an original image to generate image data of said original image;
designating a first direction of said original image to be read in said reading step;
applying image-processing, which includes an image-rotation processing, to said image data generated in said reading step, so as to generate processed image data;
controlling a rotation angle to be employed for rotating said image data by said image-rotation processing, referring to said first direction and a second direction of drawing said carrier from said stack ejecting apparatus, so that said second direction coincides with a top-to-bottom direction of said transfer sheets stacked on said stack ejecting apparatus; and
forming said output images based on said processed image data generated in said applying step.

4. The method of claim 3, wherein, in said controlling step, a transfer sheet, whose direction coincides with that of said output image to be ejected or said second direction of drawing said carrier from said stack ejecting apparatus, is selected as a usable transfer sheet to be fed to an image-forming section.

5. A method for forming an image in an image-forming apparatus to which a stack ejecting apparatus and a finishing apparatus are coupled, said stack ejecting apparatus being capable of ejecting transfer sheets, on which output images are formed, by drawing a carrier, on which said transfer sheets are stacked, from a main frame of said stack ejecting apparatus, while said finishing apparatus applying a finish processing to said transfer sheets, comprising the steps of:
reading an original image to generate image data of said original image;
designating a first direction of said original image to be read in said reading step and a second direction of said finish processing to be applied by said finishing apparatus;
applying image-processing, which includes an image-rotation processing, to said image data generated in said reading step, so as to generate processed image data;
controlling a rotation angle to be employed for rotating said image data by said image-rotation processing, referring to said first direction and said second direction designated in said designating step and a third direction of drawing said carrier from said stack ejecting apparatus; and
forming said output image based on said processed image data generated in said applying step;
wherein said rotation angle is controlled in said controlling step, so that a direction of said output image to be ejected coincides with said second direction and/or said third direction coincides with a top-to-bottom direction of said transfer sheets stacked on said stack ejecting apparatus in such a manner that said second direction overrides said third direction.

6. The method of claim 5, wherein, in said controlling step, a transfer sheet, whose direction coincides with that of said output image to be ejected, said second direction of said finish processing or said third direction of drawing said carrier from said stack ejecting apparatus, is selected as a usable transfer sheet to be fed to an image-forming section.

7. An image-forming apparatus to which a finishing apparatus is coupled, said finishing apparatus applying a finish processing to a transfer sheet on which an output image is formed, said image-forming apparatus comprising:
a reading section to read an original image so as to generate image data of said original image;
a designating section to designate a first direction of said original image to be read by said reading section, a second direction of said output image to be ejected and a third direction of said finish processing to be applied by said finishing apparatus;
an image-processing section to apply image-processing, which includes an image-rotation processing, to said image data generated by said reading section, so as to generate processed image data;
a controlling section to control a rotation angle to be employed for rotating said image data by said image-rotation processing, referring to said first direction, said second direction and said third direction designated by said designating section; and
an image-forming section to form said output image based on said processed image data generated by said image-processing section;
wherein said controlling section controls said rotation angle, so that a direction of said output image coincides with said second direction and/or said third direction designated by said designating section in such a manner that said third direction overrides said second direction.

8. The image-forming apparatus of claim 7, wherein, in said controlling step, a transfer sheet, whose direction coincides with that of said output image to, be ejected and/or that of said third direction, is selected as a usable transfer sheet to be fed to an image-forming section.

9. An image-forming apparatus to which a stack ejecting apparatus is coupled, said stack ejecting apparatus being capable of ejecting transfer sheets, on which output images are formed, by drawing a carrier, on which said transfer sheets are stacked, from a main frame of said stack ejecting apparatus, said image-forming apparatus comprising:
a reading section to read an original image so as to generate image data of said original image;
a designating section to designate a first direction of said original image to be read by said reading section;
an image-processing section to apply image-processing, which includes an image-rotation processing, to said image data generated by said reading section, so as to generate processed image data;
a controlling section to control a rotation angle to be employed for rotating said image data by said image-rotation processing, referring to said first direction and a second direction of drawing said carrier from said stack ejecting apparatus, so that said second direction coincides with a top-to-bottom direction of said transfer sheets stacked on said stack ejecting apparatus; and
an image-forming section to form said output images based on said processed image data generated by said image-processing section.

10. The image-forming apparatus of claim 9, wherein said controlling section selects a transfer sheet, whose direction coincides with that of said output image to be ejected or said second direction of drawing said carrier from said stack ejecting apparatus, as a usable transfer sheet to be fed to said image-forming section.

11. An image-forming apparatus to which a stack ejecting apparatus and a finishing apparatus are coupled, said stack ejecting apparatus being capable of ejecting transfer sheets, on which-output images are formed, by drawing a carrier, on which said transfer sheets are stacked, from a main frame of said stack ejecting apparatus, while said finishing apparatus applying a finish processing to said transfer sheets, said image-forming apparatus comprising:
a reading section to read an original image so as to generate image data of said original image;
a designating section to designate a first direction of said original image to be read by said reading section and a second direction of said finish processing to be applied by said finishing apparatus;
an image-processing section to apply image-processing, which includes an image-rotation processing, to said image data generated by said reading section, so as to generate processed image data;
a controlling section to control a rotation angle to be employed for rotating said image data by said image-rotation processing, referring to said first direction and said second direction designated by said designating section and a third direction of drawing said carrier from said stack ejecting apparatus; and
an image-forming section to form said output image based on said processed image data generated by said image-processing section;
wherein said controlling section controls said rotation angle, so that a direction of said output image to be ejected coincides with said second direction and/or said third direction coincides with a top-to-bottom direction of said transfer sheets stacked on said stack ejecting apparatus in such a manner that said second direction overrides said third direction.

12. The image-forming apparatus of claim 11, wherein said controlling section selects a transfer sheet, whose direction coincides with that of said output image to be ejected, said second direction of said finish processing or said third direction of drawing said carrier from said stack ejecting apparatus, as a usable transfer sheet to be fed to an image-forming section.

* * * * *